United States Patent [19]

Liou

[11] Patent Number: 4,556,348

[45] Date of Patent: Dec. 3, 1985

[54] COMBINED TAP AND DIE HOLDER

[76] Inventor: Mou T. Liou, No. 33, Shi Hoo Rd., Da Li Village, Taichung District, Taiwan

[21] Appl. No.: 611,410

[22] Filed: May 17, 1984

[51] Int. Cl.[4] .............................................. B23G 1/44
[52] U.S. Cl. ................................ 408/233; 408/239 R; 408/241 R
[58] Field of Search ................ 408/238, 239 R, 1 R, 408/241 R, 221, 233

[56] References Cited

FOREIGN PATENT DOCUMENTS

| | | | |
|---|---|---|---|
| 459206 | 8/1949 | Canada | 408/239 R |
| 2804475 | 8/1978 | Fed. Rep. of Germany | 408/239 R |
| 231255 | 4/1925 | United Kingdom | 408/238 |
| 610231 | 10/1948 | United Kingdom | 408/239 R |
| 156035 | 7/1963 | U.S.S.R. | 408/239 R |

*Primary Examiner*—Z. R. Bilinsky
*Attorney, Agent, or Firm*—McGlew and Tuttle

[57] ABSTRACT

A combined tap and die holder which comprises a housing including a circular recess for receiving a die and two diametrically opposite tubular recesses for receiving two clamping members for clamping a tap. The clamping members are retrated in the tubular recesses when the die is placed in the circular recess.

1 Claim, 5 Drawing Figures

COMBINED TAP AND DIE HOLDER

BACKGROUND OF THE INVENTION

This invention relates to holding devices for tap and die, particularly to an improved construction of a combined tap and die holder.

A tap holder typically includes a housing having a rectangular recess 2 for receiving two clamping members 3 which can be moved to its clamping position or its releasing position by operating the handle 4, as shown in FIG. 1. A die holder typically comprises a housing having a circular recess 5 for receiving a die 6 and a clamping screw 7 for clamping the die in the housing, as shown in FIG. 2.

SUMMARY OF THE INVENTION

An object of the invention is to provide a combined tap and die holder, thereby reducing the investment in the machinery and facilitating the storage for component parts.

The foregoing and other objects can be achieved in accordance with the present invention through the provision of a combined tap and die holder which comprises a housing having a circular recess for receiving a die and two diametrically opposite tubular recesses communicated with the circular recess in radial positions. There are two clamping members slidably received in the tubular recesses respectively each of which has a notch at its one end. Two handles are threadedly inserted into said tubular recesses and connected to other ends of the clamping members respectively. The handles are capable of moving the clamping members to extend them into the circular recess for clamping a tap or to retract them in the tubular recesses when they are rotated. There is further provided a means for restricting the clamping members against angular movements and a means for tightly clamping the die in the circular recess when the die is placed in said circular recess.

The clamping member may include a longitudinal groove and the restricting means may include a guide screw which is threadedly passed through the wall of the housing and extended into said groove.

The presently exemplary preferred embodiment will be described in detail with reference to the accompanying drawings.

DETAILED DESCRIPTION OF THE PREFERRED EMBODIMENT

Figure 1:
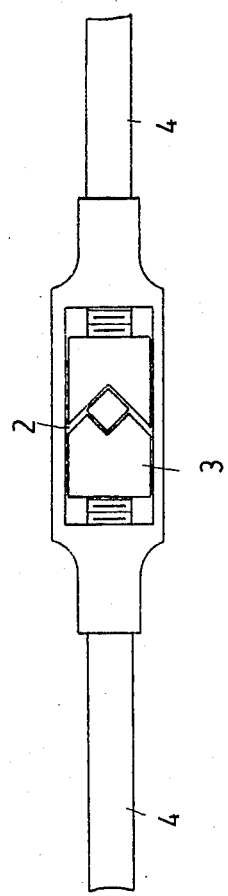
FIG. 1 is a schematic view of a tap holder in the prior art.
Figure 2:
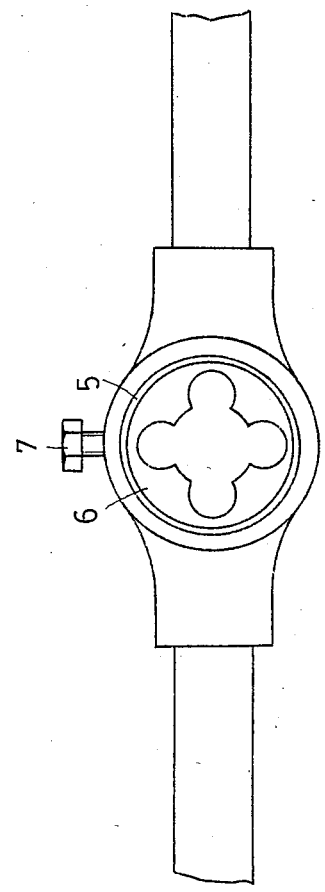
FIG. 2 is a schematic view of a die holder in the prior art.
Figure 3:
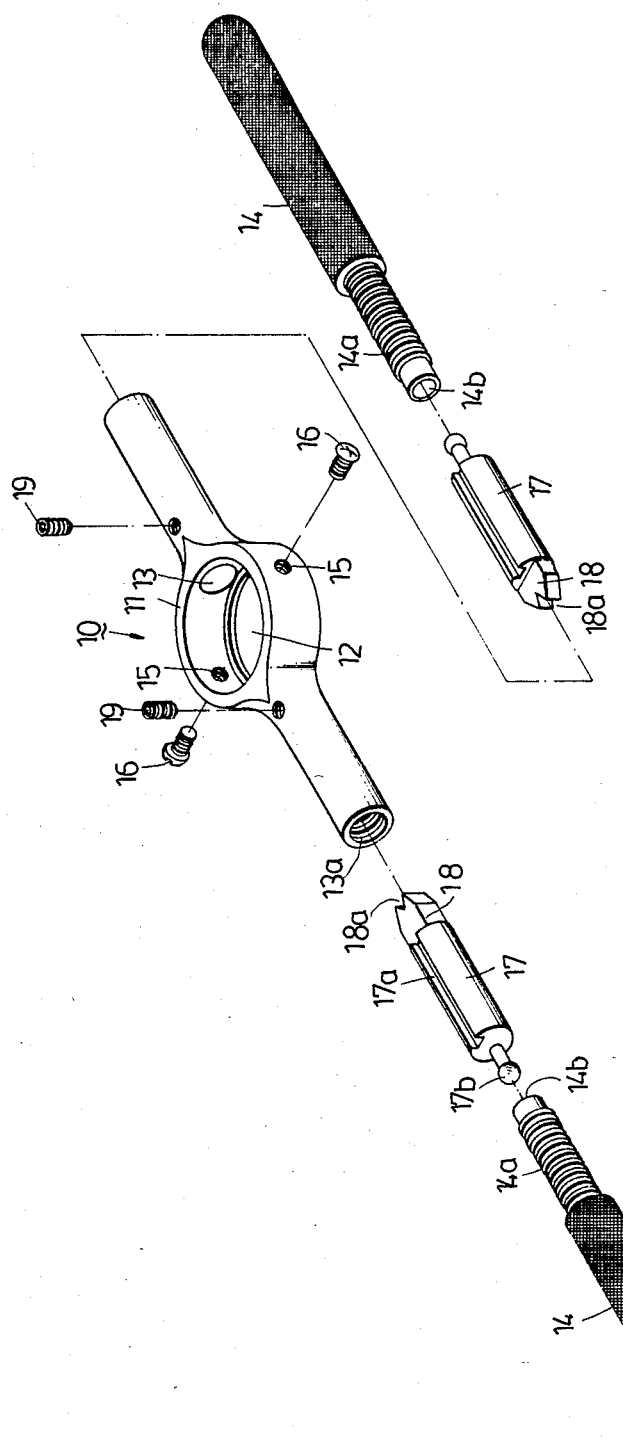
FIG. 3 is an exploded view of an embodiment of the holder according to the invention.
Figure 4:
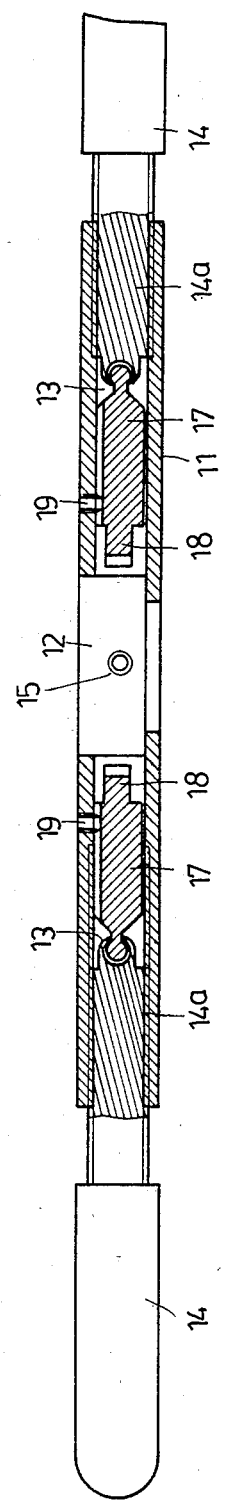
FIG. 4 is a partially sectioned view of the same embodiment as FIG. 3.
Figure 5:
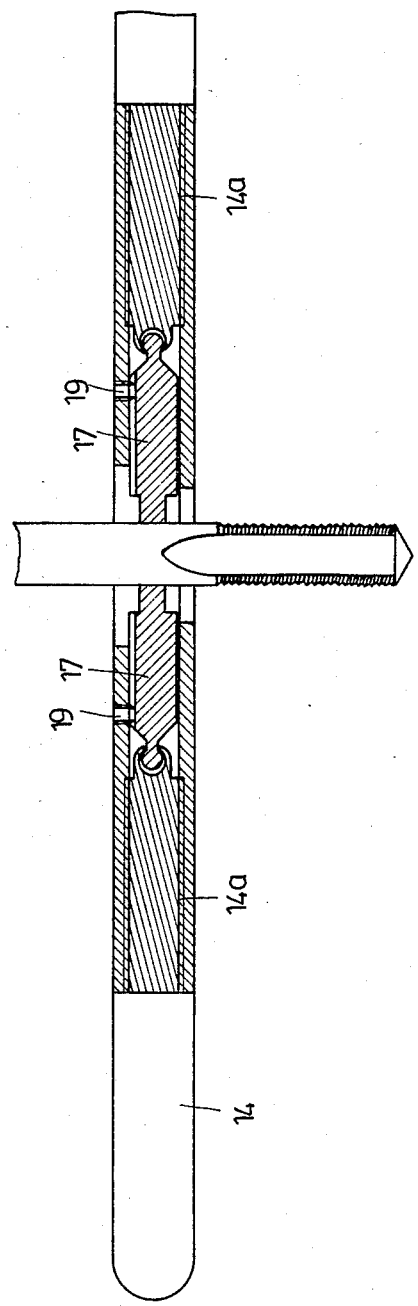
FIG. 5 is a schematic view of the holder which is clamping a tap.

Referring to the drawings, there is shown a combined tap and die holder 10 which includes a housing 11 having a circular recess 12 and two tubular recesses 13 communicated with the circular recess 12 at diametrically opposite positions. There are further provided two handles 14 threadedly inserted into the tubular recesses 13 respectively the inner sides of the walls of which are provided with female threads 13a. In the wall defining the circular recess 12 is provided, two diametrically opposite screw holes 15 for locating two clamping screws 16.

Each of the handles 14 is substantially cylindrical in shape and has male threads 14a at its one end portion. At the extremity of the handle 14 is provided a socket 14b.

There are further provided two slidable clamping members 17 in the tubular recesses 13 respectively. Each of the clamping members 17 has a cylindrical body with a longitudinal groove 17a and a ball-shaped end 17b for being connected to the socket 14b. At the opposite end of the clamping members 17 is further provided a clasp member 18 of rectangular cross-section with a rightangled notch 18a for tightly holding a tap together with another clasp member 18. In the walls defining the tubular recesses 13 are respectively provided two guide screws 19 which pass through the walls and extend into the grooves 17a of the clamping members 17 respectively, thereby restricting the movements of the clamping members 17 in angular directions when the handles 14 are rotated.

When the holder 10 is used to hold a tap, the clamping members 17 are moved inward to extend into the circular recess 12 by rotating the handles 14. When the holder 10 is used to hold a die, the clamping members 17 are retracted into the recesses 13 and the die is placed in the circular recess 12 and locked against movement by tightening the clamping screws 19.

With the invention thus explained, it is apparent that obvious modifications and variations can be made without departing from the scope of the invention. It is therefore intended that the invention be limited only as indicated in the appended claims.

I claim:

1. A combined cap and die holder, comprising a housing having a circularly cylindical recess, first and second tubular recesses extending outwardly from each respective side of the circular recess, a clamping member slidable in respective tubular recesses each having a notch at respective ends facing the circular recess, a handle threadably engaged in each tubular recess and connected to each respective slide and being movable axially in said tubular recess to advance said slide in selected axial directions in accordance with the direction of rotation of the threading of its associated handle, a circularly cylindrical die engageable in said circularly cylindrical recess, a clamp threaded through said housing and engageable with said die to hold said die tightly in said cylindrical recess, a tap having an angle clamping end positionable in said circular recess, said handles being threadable to advance said clamping members inwardly into engagement with the angle clamping end of said tap when said die is removed from said circular recess.

* * * * *